United States Patent
Shiina

(10) Patent No.: US 6,822,027 B2
(45) Date of Patent: Nov. 23, 2004

(54) RUBBER COMPOSITION AND HEAVY DUTY PNEUMATIC TIRE USING THE RUBBER COMPOSITION

(75) Inventor: Nobuharu Shiina, Tokyo (JP)

(73) Assignee: Bridgestone Corporation, Tokyo (JP)

( * ) Notice: Subject to any disclaimer, the term of this patent is extended or adjusted under 35 U.S.C. 154(b) by 266 days.

(21) Appl. No.: 09/942,992

(22) Filed: Aug. 31, 2001

(65) Prior Publication Data

US 2002/0049294 A1 Apr. 25, 2002

(30) Foreign Application Priority Data

Sep. 1, 2000 (JP) ....................... 2000-265192

(51) Int. Cl.⁷ ............................... C08K 5/22
(52) U.S. Cl. ...................................... 524/189
(58) Field of Search ......................... 524/189

(56) References Cited

U.S. PATENT DOCUMENTS 5,463,003 A   10/1995   Horikawa et al.
5,726,237 A    3/1998   Satoh et al.

FOREIGN PATENT DOCUMENTS

EP   0 909 788 A1   4/1999
JP   2000211313     8/2000

*Primary Examiner*—Peter D. Mulcahy
(74) *Attorney, Agent, or Firm*—Sughrue Mion, PLLC

(57) ABSTRACT

The rubber composition exhibits improved abrasion resistance, tear resistance and low heat generating property and is advantageously used for tread rubber of heavy duty pneumatic tires.

7 Claims, No Drawings

RUBBER COMPOSITION AND HEAVY DUTY PNEUMATIC TIRE USING THE RUBBER COMPOSITION

BACKGROUND OF THE INVENTION

1. Field of the Invention

The present invention relates to a rubber composition and a heavy duty pneumatic tire comprising the rubber composition. More particularly, the present invention relates to a rubber composition advantageously used for tread rubber of heavy duty pneumatic tires and a heavy duty pneumatic tire comprising the rubber composition in tread rubber.

2. Description of the Related Arts

To improve abrasion resistance and the life of a heavy duty pneumatic tire used for trucks and buses, it is important that rigidity of the tread is enhanced, a decrease in the life due to damages by outside causes is prevented and elevation of temperature of tread rubber due to repeated deformation during driving is suppressed.

Heretofore, to increase the life of a tire, an amount of, for example, carbon black, a resin, a vulcanizing agent such as sulfur, or an auxiliary vulcanizing agent used in the rubber composition is increased. When the amount of carbon black is increased, however, the low heat generating property and heat resistance inevitably deteriorate although abrasion resistance is improved. When the amount of either a vulcanizing agent such as sulfur or an auxiliary vulcanizing agent is increased, heat resistance decreases while the low heat generating property and abrasion resistance are not affected. When the amount of a resin is increased, abrasion resistance and the low heat generating property deteriorate although heat resistance is improved. It is also known that, when natural rubber exhibiting an excellent maximum elongation at high temperatures is blended with SBR exhibiting a high hardness at small deformations, a problem arises with respect to the low heat generating property although abrasion resistance and heat resistance are improved.

For tread rubber of heavy duty pneumatic tires, in general, an isoprene rubber such as natural rubber is used as the rubber component and a combination of carbon black and silica is used as the reinforcing filler so that an excellent balance between abrasion resistance and the low heat generating property is achieved.

A rubber composition comprising an isoprene rubber as the rubber component, however, has a problem in that the modulus tends to decrease due to reversion under over-cure and the low heat generating property tends to deteriorate. In particular, in tires of large sizes such as tires having a total gauge at the hump position in the tread portion of 50 mm or greater, problems arise in that the low heat generating property deteriorates and abrasion resistance decreases.

It is frequently conducted that a loss lowering agent (an agent for providing the property of less heat generation) such as 5-nitroso-8-hydroxyquinoline as a typical example is added to the above composition in order that the low heat generating property of a heavy duty tire is improved. The effect of conventional loss lowering agents such as that described above, however, varies depending on the degree of vulcanization and a problem arises in that the effect of improving the low heat generating property is not sufficiently exhibited for tires, in particular, of large sizes since the modulus decreases due to over-cure which tends to take place in production of such tires.

SUMMARY OF THE INVENTION

The present invention has an object of providing a rubber composition which exhibits improved abrasion resistance, tear resistance and low heat generating property and is advantageously used for tread rubber of heavy duty pneumatic tires, and it is another object to provide a heavy duty pneumatic tire using the rubber composition for tread rubber.

As a result of intensive studies by the present inventor, it was found that the objects can be achieved by a rubber composition which comprises a rubber component comprising a modified styrene-butadiene copolymer rubber having a tin atom introduced into the molecular chain, which is obtained by a solution polymerization and natural rubber or an synthetic isoprene rubber as the essential components at a specific compounding ratio and a hydrazide compound. The present invention has been completed based on this knowledge.

The present invention provides a rubber composition which comprises (A) a rubber component comprising 15 to 55% by weight of (i) a modified styrene-butadiene copolymer rubber having a tin atom introduced into the molecular chain, which is obtained by a solution polymerization, 45 to 85% by weight of (ii) at least one rubber selected from natural rubber and synthetic isoprene rubbers and (B) a hydrazide compound.

The present invention also provides a heavy duty pneumatic tire which comprises a tread rubber comprising a rubber composition described above.

DESCRIPTION OF THE PREFERRED EMBODIMENTS

The rubber composition of the present invention comprises (A) a rubber component comprising (i) a modified styrene-butadiene copolymer rubber, (ii) at least one rubber selected from natural rubber and synthetic isoprene rubbers and, where desired, (iii) other conjugated diene rubbers.

The above modified styrene-butadiene copolymer rubber of component (i) is obtained by a solution polymerization and modified by introducing tin atom into the molecular chain.

The modified styrene-butadiene copolymer rubber can be produced, for example, in accordance with the following processes.

In the first two processes, 1,3-butadiene and styrene are used as the raw materials. The raw materials are anionically copolymerized in a solution by using an alkali metal compound, preferably a lithium compound, as a polymerization initiator and a styrene-butadiene base copolymer having a reactive chain ends is obtained. The desired modified styrene-butadiene copolymer rubber can be obtained by modifying the obtained copolymer with a tin compound.

In the third process, 1,3-butadiene and styrene are used as the raw materials. The raw materials are anionically copolymerized in a solution by using an alkali metal compound, preferably a lithium compound, having a tin compound as a polymerization initiator, and a styrene-butadiene base copolymer having a reactive chain end is obtained. The reactive chain end may be modified with a modifier, such as a tin compound, an alkoxysilane compound, and a nitrogen-containing compound, or may be terminated without modification.

In the forth process, 1,3-butadiene and styrene are used as the raw materials. The raw materials are anionically copolymerized in a solution by using an alkali metal compound, preferably a lithium compound, having a tin atom and a nitrogen atom as a polymerization initiator, and a styrene-butadiene copolymer having a tin atom and a nitrogen atom in its molecule is obtained.

In the fifth process, 1,3-butadiene and styrene and a compound having a tin atom are used as the raw materials. The raw materials are anionically copolymerized in a solution by using an alkali metal compound, preferably a lithium compound, as a polymerization initiator, and a styrene-butadiene base copolymer having a reactive chain end is obtained. The reactive chain end may be modified with a modifier, such as a tin compound, an alkoxysilane compound, and a nitrogen-containing compound, or may be terminated without modification.

These processes may be used in combination.

By using any of third through fifth processes, a copolymer having a tin atom in its molecule can be obtained without a modification step.

As the lithium compound used as the polymerization initiator in the first, second and fifth processes, a hydrocarbyllithium compound or a lithium amide compound is preferably used. When a hydrocarbyllithium compound is used, a styrene-butadiene base copopolymer in which initiating chain end has a hydrocarbyl group can be obtained. When a lithium amide compound is used as the polymerization initiator, a styrene-butadiene base copolymer in which the initiating chain end has a group having a nitrogen atom can be obtained.

A base copolymer used here means a copolymer before a termination step, which has a reactive end.

As the hydrocarbyllithium compound, those having a hydrocarbyl group having 2 to 20 carbon atoms are preferable. Examples of the hydrocarbyllithium compound include ethyllithium, n-propyllithium, isopropyllithium, n-butyllithium, sec-butyllithium, tert-octyllithium, n-decyllithium, phenyllithium, 2-naphthyllithium, 2-butylphenyllithium, 4-phenylbutyllithium, cyclohexyllithium, cyclopentyllithium and reaction products of diispropenylbenzene and butyllithium. Among these compounds, n-butyllithium is more preferable.

Examples of the lithium amide compound include lithium hexamethyleneimide, lithium pyrrolidide, lithium piperidide, lithium heptamethyleneimide, lithium dodecamethyleneimide, lithium dimethylamide, lithium diethylamide, lithium dibutylamide, lithium dipropylamide, lithium diheptylamide, lithium dihexylamide, lithium dioctylamide, lithium bis(2-ethylhexylamide), lithium didecylamide, lithium N-methylpiperadide, lithium ethylpropylamide, lithium ethylbutylamide, lithium methylbutylamide, lithium ethylbenzylamide and lithium methylphenetylamide. Among these compounds, cyclic lithium amides such as lithium hexamethyleneimide, lithium pyrrolidide, lithium piperidide, lithium heptamethyleneimide and lithium dodecamethyleneimide are more preferable and lithium hexamethyleneimide and lithium pyrrolidide are particularly preferable.

As the lithium compound used as a polymerization initiator in the third process, a triorganotin lithium compound such as tributyltin lithium and trioctyltin lithium may be used.

As lithium compound having a tin atom and a nitrogen atom used in the forth process, a triorganoamide stannyllithium represented by the general formula (a) shown bellow or a triorganoimide stannyllithium represented by the general formula (b) shown bellow may preferably be used.

Formula (a):

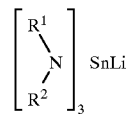

(a)

wherein $R^1$ and $R^2$ each independently represents an aliphatic hydrocarbon group containing 1 to 20 carbon atoms, an aromatic hydrocarbon group containing 5 to 20 carbon atoms, or a cycloaliphatic hydrocarbon group containing 3 to 20 carbon atoms; and triorganotin lithium compound represented by general formula (b):

$$\left[ \underset{X \quad N}{\bigcirc} \right]_3 SnLi \qquad (b)$$

wherein X represents: a saturated cyclic group having the formula $(CR^3R^4)_n$; a saturated cyclic group having the formula $(CR^5R^6)_m$—Y—$(CR^5R^6)_l$, wherein Y represents $NR^7$ or O; or imine compounds having a carbon-carbon double bond;

wherein $R^3$, $R^4$, $R^5$ and $R^6$ each independently represents hydrogen or an aliphatic hydrocarbon group containing 1 to 10 carbon atoms, an aromatic hydrocarbon group containing 5 to 10 carbon atoms, or a cycloaliphatic hydrocarbon group containing 3 to 10 carbon atoms, $R^7$ is an aliphatic hydrocarbon group containing 1 to 10 carbon atoms, an aromatic hydrocarbon group containing 5 to 10 carbon atoms, or a cycloaliphatic hydrocarbon group containing 3 to 10 carbon atoms, n represents an integer between 3 and 10, and the sum of m and is between 2 and 9.

Examples of the preferable triorganotin lithium compound among them include, tripyrrolididestannyllithium, trihexamethyleneimidestannyllithium, tri(diethyl)amidestannyllithium and tri(dipropyl)amidestannyllithium.

An objective styrene-butadiene copolymer can also be obtained by introducing a third monomer containing a tin atom.

As the third monomer copolymerized with styrene and 1,3-butadiene, a compound represented by the following general formula (c) or (d) may preferably be used.

Formula (c)

$$CH_2{=}CH{-}\underset{\underset{R^9}{\overset{R^8 \quad Sn \quad R^{10}}{|}}}{C}{=}CH_2 \qquad (c)$$

wherein $R^8$, $R^9$ and $R^{10}$ each represents an aliphatic hydrocarbon group having 1 to 30 carbon atoms, an alicyclic hydrocarbon group or an aromatic hydrocarbon group and the groups represented by $R^8$, $R^9$ and $R^{10}$ may be the same with or different from each other;

Formula (d):

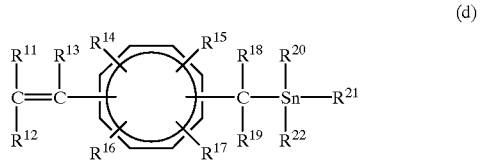

wherein $R^{11}R^{12}C=CR^{13}-$, $R^{14}$, $R^{15}$, $R^{16}$ and $R^{17}$ each represent a group bonded to the benzene group, $R^{11}$, $R^{12}$, $R^{13}$, $R^{14}$, $R^{15}$, $R^{16}$, $R^{17}$, $R^{18}$, $R^{19}$, $R^{20}$, $R^{21}$ and $R^{22}$ each represent hydrogen atom, an aliphatic hydrocarbon group having 1 to 30 carbon atoms, an alicyclic hydrocarbon group or an aromatic hydrocarbon group, $R^{20}$, $R^{21}$ and $R^{22}$ each represent an aliphatic hydrocarbon group having 1 to 30 carbon atoms, an alicyclic hydrocarbon group or an aromatic hydrocarbon group and the atom or the groups represented by $R^{11}$ to $R^{22}$ may be the same with or different from each other.

Preferable examples of the compound represented by general formula (c) include 2-tributylstannyl-1,3-butadiene, 2-trioctylstannyl-1,3-butadiene, 2-tricyclohexyl-1,3-butadiene, 2-triphenylstannyl-1,3-butadiene, 2-dibutylphenylstannyl-1,3-butadiene and 2-diphenyloctylstannyl-1,3-butadiene. Preferable examples of the compound represented by general formula (d) include m-vinylbenzyl- tributyltin, m-vinylbenzyltrioctyltin, m-vinylbenzyltriphenyltin, m-(1-phenylvinyl) benzyltributyltin, p-isomers of these compounds and mixtures of the m-isomers and the p-isomers of these compounds.

A triorganoamide stannyllithium or a triorganoamide stannyllithium is preferably used.

The triorganotin lithiums are described in U.S. Pat. No. 5,502,129, which is hereby incorporated by reference, and the triorganoamide stannyllithiums and triorganoimide stannyllithiums are described in U.S. Pat No. 5,463,003, which is hereby incorporated by reference, The process for producing the styrene-butadiene copolymer using the above lithium compound as the initiator by the anionic polymerization is not particularly limited and a conventional process can be used.

Specifically, an objective styrene-butadiene copolymer can be obtained by an anionic polymerization of styrene and 1,3-butadiene in an organic solvent which is inert to the reaction, for example, in a hydrocarbon solvent such as an aliphatic, alicyclic or aromatic hydrocarbon compound, using the above lithium compound as a polymerization initiator and, where desired, in the presence of a randomizer.

The temperature in the polymerization reaction is selected, in general, in the range of −80 to 150° C. and preferably in the range of −20 to 100° C. The polymerization reaction may be conducted under a pressure generated by the reaction system. In general, however, it is preferable that the operations in the reaction are conducted under a sufficient pressure which can keep the monomers substantially in the liquid phase. Where desired, a higher pressure may be applied and such a pressure can be obtained in accordance with a suitable method, for example, by charging the reactor with a gas inert to the polymerization reaction.

In the styrene-butadiene base copolymer obtained above, the initiating chain end has a hydrocarbyl group or a group having a nitrogen atom while the other chain end is polymerization active. The desired modified styrene-butadiene copolymer rubber can be obtained by reacting a tin compound with the polymerization active chain end of the above copolymer.

Examples of the tin compound include tin tetrachloride, tributyltin chloride, dioctyltin dichloride, dibutyltin dichloride and triphenyltin chloride.

In component (A) of the rubber composition of the present invention, at least one rubber selected from natural rubber and synthetic isoprene rubber is used as component (ii). The synthetic isoprene rubber is obtained by polymerizing isoprene monomer. In particular, synthetic isoprene rubber having about 98% of the cis-1,4 structure has basic properties close to those of natural rubber since its molecular structure is very close to that of natural rubber.

Examples on the other conjugated diene rubbers of component (iii) which are used, where desired, include polybutadiene rubbers (BR), other styrene-butadiene rubbers (SBR), acrylonitrile-butadiene rubbers (NBR), chloroprene rubbers (CR) arid butyl rubbers (IIR). The other conjugated rubber may be used singly or in combination of two or more.

In the rubber composition of the present invention, the compounding ratio of the components in component (A) are as follows: 15 to 55% by weight of component (i); 45 to 85% by weight of component (ii); and 0 to 40% by weight of component (iii). When the compounding ratio of the components are outside the above ranges, a rubber composition having the desired physical properties cannot be obtained. It is preferable that component (A) comprises 15 to 55% by weight of component (i) and 85 to 45% by weight of component (ii) from the standpoint of the balance among the physical properties.

Examples of the hydrazide compound used as component (B) in the rubber composition of the present invention include compounds represented by general formula (I):

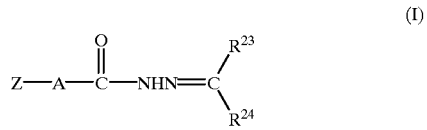

In the above general formula (I), A represents an arylene group, a divalent hydantoin residue or a saturated or unsaturated divalent aliphatic hydrocarbon group having 1 to 18 carbon atoms. The arylene group include divalent aromatic heterocyclic groups. As the arylene group, phenylene group and naphthylene group are preferable and these groups may have suitable substituents such as lower alkyl groups and lower alkoxyl groups on the ring. The divalent hydantoin residue may have suitable substituents such as lower alkyl groups and lower alkoxyl groups on the ring. Examples of the saturated or unsaturated divalent aliphatic hydrocarbon group having 1 to 18 carbon atoms include alkylene groups having 1 to 18 carbon atoms and alkenylene groups having 2 to 18 carbon atoms. These groups may be linear groups or branched groups. Examples of the alkylene group and the alkenylene group include methylene group, ethylene group, propylene group, butylene group, hexylene group, octylene group, decylene group, vinylene group, allylene group, propenylene group, butenylene group, hexenylene group, octenylene group and decenylene group, Z represents a hydrogen atom, a hydroxyl group, an amino group or a group represented by the following formula:

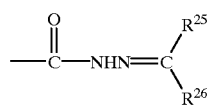

$R^{23}$ to $R^{26}$ each represent a hydrogen atom, or a hydrocarbyl group having 1 to 18 carbon atoms. The $R^{23}$ to $R^{26}$ may be the same with or different from each other. The groups represented by $R^{23}$ and $R^{24}$ may be bonded to each other and form a ring structure and the groups represented by $R^{25}$ and $R^{26}$ may be bonded to each other and form a ring structure. Examples of the hydrocarbyl group having 1 to 18 carbon atoms include linear and branched alkyl groups having 1 to 18 carbon atoms, linear and branched alkenyl groups having 2 to 18 carbon atoms, cycloalkyl groups having 3 to 18 carbon atoms, aryl groups having 3 to 18 carbon atoms and aralkyl groups having 7 to 18 carbon atoms. The above cycloalkyl groups, aryl groups and aralkyl groups may have suitable substituents such as lower alkyl groups, low alkoxyl groups, amino group, amino groups substituted with alkyl groups and hydroxyl group on the ring.

Examples of the alkyl group described above include methyl group, ethyl group, n-propyl group, isopropyl group, n-butyl group, isobutyl group, sec-butyl group, tert-butyl group, pentyl group, hexyl group, octyl group and decyl group. Examples of the alkenyl group include vinyl group, allyl group, propenyl group, butenyl group, hexenyl group, octenyl group and decenyl group. Examples of the cycloalkyl group include cyclopentyl group, cyclohexyl group and methylcyclohexyl group. Examples of the aryl group include phenyl group, tolyl group, xylyl group, naphthyl group and methylnaphthyl group. Examples of the aralkyl group include benzyl group, phenetyl group and naphthylmethyl group.

Among the compounds represented by general formula (I), compounds represented by general formula in which A represents an arylene group and Z represents hydroxyl group are preferable. Hydrazide compounds represented by general formula (I-a):

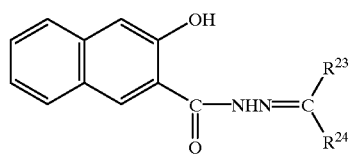

(I-a)

and hydrazide compounds represented by general formula (I-b):

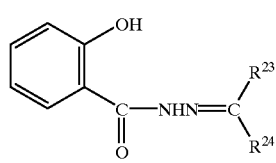

(I-b)

are more preferable from the standpoint of the properties of the resulting rubber composition. In the above general formulae, $R^{23}$ and $R^{24}$ are as defined above.

Examples of the hydrazide compound represented by the above general formula (I) include 1-hydroxy-N'(1-methylethylidene)-2-naphthoic acid hydrazide, 1-hydroxy-N'-(1-methylpropylidene)-2-naphthoic acid hydrazide, 1-hydroxy-N'-(1-methylbutylidene)-2-naphthoic acid hydrazide, 1-hydroxy-N'-(1,3-dimethylbutylidene)-2-naphthoic acid hydrazide, 1-hydroxy-N'-(2,6-dimethyl-4-heptylidene)-2-naphthoic acid hydrazide, 2-hydroxy-N'-(1-methylethylidene)-3-naphthoic acid hydrazide, 2-hydroxy-N'-(1-methylpropylidene)3-naphthoic acid hydrazide, 2-hydroxy-N'-(1-methylbutylidene)-3-naphthoic acid hydrazide, 2-hydroxy-N'-(1,3-dimethylbutylidene)-3-naphthoic acid hydrazide, 2-hydroxy-N'-(2,6-dimethyl-4-heptylidene)3-naphthoic acid hydrazide, isophthalic acid di(1-methylethylidene)hydrazide, isophthalic acid di(1-methylpropylidene)-hydrazide, isophthalic acid di(1-methylbutylidene)-hydrazide, isophthalic acid di(1,3-dimethylbutylidene)hydrazide, isophthalic acid di(2,6-dimethyl-4-heptylidene)hydrazide, isonicotinic acid (1-methylethylidene)-hydrazide, isonicotinic acid (1-methylpropylidene)hydrazide, isonicotinic acid (1-methylbutylidene)hydrazide, isonicotinic acid (2,6-dimethyl-4-heptylidene)hydrazide, isonicotinic acid (1,3-dimethylbutylidene)-hydrazide, N'-(1-methylethylidene) salicylic acid hydrazide, N'-(1-methylpropylidene)salicylic acid hydrazide, N'-(1-methylbutylidene)-salicylic acid hydrazide, N'-(1,3-dimethylbutylidene)salicylic acid hydrazide, N'-(2,6-dimethyl-4-heptylidene)salicylic acid hydrazide, N'-(1-methylethylidene)benzoic acid hydrazide, N'-(1-methylpropylidene)benzoic acid hydrazide, N'-(1,3-dimethylbutylidene)benzoic acid hydrazide, N'-(benzylidene)benzoic acid hydrazide, N'-(4-dimethylaminophenyl-methylene)benzoic acid hydrazide, N'-(4-methoxyphenylmethylene)benzoic acid hydrazide, N'-(4-hydroxyphenylmethylene)benzoic acid hydrazide, N'-(1-phenylethylidene)benzoic acid hydrazide, N'-(diphenylmethylene)-benzoic acid hydrazide, N'-(1-(2,4-dihydroxyphenyl)benzylidene)benzoic acid hydrazide, N'-(1-methylethylidene)-1-naphthoic acid hydrazide, N'-(1-methylpropylidene)1-naphthoic acid hydrazide, N'-(1,3-dimethyl-butylidene)-1-naphthoic acid hydrazide, N'-(benzylidene)-1-naphthoic acid hydrazide, N'-(4-dimethylaminophenylmethylene)-1-naphthoic acid hydrazide, N'-(4-methoxyphenylmethylene)-1-naphthoic acid hydrazide, N'-(4-hydroxyphenylmethylene)-1-naphthoic acid hydrazide, N'-(1-phenylethylidene)-1-naphthoic acid hydrazide, N'-(diphenylmethylene)-1-naphthoic acid hydrazide, N'-(1-(2,4-dihydroxyphenyl) benzylidene)-1-naphthoic acid hydrazide, N'-(1-methylethylidene)-2-naphthoic acid hydrazide, N'-(1-methylpropylidene)-2-naphthoic acid hydrazide, N'-(1,3-dimethylbutylidene)-2-naphthoic acid hydrazide, N'-(benzylidene)-2-naphthoic acid hydrazide, N'-(4-dimethylaminophenylmethylene)-2-naphthoic acid hydrazide, N'-(4-methoxyphenylmethylene)-2-naphthoic acid hydrazide, N'-(4-hydroxyphenylmethylene)2-naphthoic acid hydrazide, N'-(1-phenylethylidene)-2-naphthoic acid hydrazide, N'-(diphenylmethylene)-2-naphthoic acid hydrazide, N'-(1-(2,4-dihydroxy-phenyl)benzylidene)-2-naphthoic acid hydrazide, N'-(4-methylethylidene)-propionic acid hydrazide, N'-(1-methylpropylidene) propionic acid hydrazide, N'-(1,3-dimethylbutylidene) propionic acid hydrazide, N'-(1-benzylidene)propionic acid hydrazide, N'-(4-dimethylaminophenyl-methylene) propionic acid hydrazide, N'-(4-methoxyphenylmethylene)-propionic acid hydrazide, N'-(4-hydroxyphenylmethylene) propionic acid hydrazide, N'-(1-phenylethylidene)propionic acid hydrazide, N'-(diphenylmethylene)propionic acid hydrazide, N'-(1-(2,4-dihydroxy-phenyl)benzylidene)

propionic acid hydrazide, N'-(4-methylethylidene)-2-methylpropionic acid hydrazide, N'-(1-methylpropylidene)-2-methyl-propionic acid hydrazide, N'-(1,3-dimethylbutylidene)2-methylpropionic acid hydrazide, N'-(benzylidene)2-methylpropionic acid hydrazide, N'-(4-dimethylaminophenylmethylene)-2-methylpropionic acid hydrazide, N'-(4-methoxyphenylmethylene)-2-methylpropionic acid hydrazide, N'-(4-hydroxyphenylmethylene)-2-methylpropionic acid hydrazide, N'-(1-phenylethylidene)-2-methylpropionic acid hydrazide, N'-(diphenylmethylene)-2-methylpropionic acid hydrazide, N'-(1-(2,4-dihydroxy-phenyl)benzylidene)-2-methylpropionic acid hydrazide, N'-(1-methylethylidene)-2, 2-dimethylpropionic acid hydrazide, N'-(1-methylpropylidene)-2,2-dimethylpropionic acid hydrazide, N'-(1,3-dimethylbutylidene)-2,2-&methylpropionic acid hydrazide, N'-(benzylidene)-2,2-dimethylpropionic acid hydrazide, N'-(4-dimethylamino-phenylmethylene)-2,2-dimethylpropionic acid hydrazide, N'-(4-methoxyphenylmethylene)-2,2-dimethylpropionic acid hydrazide, N'-(4-hydroxyphenylmethylene)-2,2-dimethylpropionic acid hydrazide, N'-(1-phenylethylidene)-2,2-dimethylpropionic acid hydrazide, N'-(diphenylmethylene)-2,2-dimethylpropionic acid hydrazide and N'-(1-(2,4-dihydroxyphenyl)benzylidene)-2,2-dimethylpropionic acid hydrazide.

Examples of the preferable hydrazide compounds among the above hydrazide compounds include 1-hydroxy-N'-(1-methylethylidene)-2-naphthoic acid hydrazide, 1-hydroxy-N'-(1-methylpropylidene)2-naphthoic acid hydrazide, 1-hydroxy-N'-(1-methylbutylidene)-2-naphthoic acid hydrazide, 1-hydroxy-N'-(1,3-dimethylbutylidene)-2-naphthoic acid hydrazide, 1-hydroxy-N'-(2,6-dimethyl-4-heptylidene)-2-naphthoic acid hydrazide, 2-hydroxy-N'-(1-methylethylidene)-3-naphthoic acid hydrazide, 2-hydroxy-N'-(1-methylpropylidene)-3-naphthoic acid hydrazide, 2-hydroxy-N'-(1-methylbutylidene)3-naphthoic acid hydrazide, 2-hydroxy-N'-(1,3-dimethylbutylidene)-3-naphthoic acid hydrazide, 2-hydroxy-N'-(2,6-dimethyl-4-heptylidene)-3-naphthoic acid hydrazide, isophthalic acid di(1-methylethylidene)hydrazide, isophthalic acid di(1-methylpropylidene)hydrazide, isophthalic acid di(1-methylbutylidene)hydrazide, isophthalic acid di(1,3-dimethylbutylidene)hydrazide, isophthalic acid di(2, 6diethyl-4heptylidene)hydrazide, isonicotinic acid (1-methylethylidene)hydrazide, isonicotinic acid (1-methylpropylidene)hydrazide, isonicotinic acid (1-methylbutylidene)hydrazide, isonicotinic acid (1,3-dimethylbutylidene)hydrazide, isonicotinic acid (2,6-dimethyl-4-heptylidene)hydrazide, N'-(1-methylethylidene)salicylic acid hydrazide, N'-(1-methylpropylidene)salicylic acid hydrazide, N'-(1-methylbutylidene)salicylic acid hydrazide, N'-1,3-dimethylbutylidene)salicylic acid hydrazide and N'-(2,6-dimethyl-4-heptylidene)salicylic acid hydrazide.

Compounds represented by general formula (I-a) and compounds represented by general formula (I-b) are more preferable. Examples of the more preferable compounds include 2(hydroxy-N'-(1-methylethylidene)-3-naphthoic acid hydrazide, 2-(hydroxy-N'-(1-methylpropylidene)-3-naphthoic acid hydrazide, 2-hydroxy-N'-(1-methylbutylidene)3-naphthoic acid hydrazide, 2-hydroxy-N'-(1,3-dimethylbutylidene)-3-naphthoic acid hydrazide, 2-(hydroxy-N'-(2,6-dimethyl-4-heptylidene)-3-naphthoic acid hydrazide, N'-(1-methylethylidene)salicylic acid hydrazide, N'-(1-methylpropylidene)-salicylic acid hydrazide, N'-1-methylbutylidene)salicylic add hydrazide, N'-(1,3-dimethylbutylidene)salicylic acid hydrazide and N'-(2,6-dimethyl-4-heptylidene)salicylic acid hydrazide.

The hydrazide compound of component (B) suppresses the decrease in modulus due to reversion under over-cure and the deterioration in the low heat generating property and abrasion resistance.

In the present invention, the hydrazide compound of component (B) may be used singly or in combination of two or more. The amount of component (B) used in the composition is selected, preferably, in the range of 0.05 to 5 parts by weight per 100 parts by weight of the rubber component (A). When the amount is smaller than 0.05 parts by weight, there is a possibility that the decrease in modulus is not sufficiently suppressed. When the amount exceeds 5 parts by weight, the effect is not enhanced to the degree expected from the amount and economic disadvantage occasionally arises. From the standpoint of the effect and economy, it is more preferable that the amount of component (B) is in the range of 0.3 to 3 parts by weight The rubber composition of the present invention may further comprise carbon black as component (C). As the carbon black, those having a specific surface area by nitrogen adsorption ($N_2SA$) of 50 $m^2/g$ or greater is preferable. When $N_2SA$ is smaller than 50 $m^2/g$, a sufficient abrasion resistance may not be obtained. As the value of $N_2SA$ becomes greater, the low heat generating property tends to be deteriorated From the standpoint of the desirable balance between abrasion resistance and the low heat generating property, it is more preferable that $N_2SA$ is in the range of 80 to 160 $m^2/g$. $N_2SA$ is obtained in accordance with the method of ASTM D3037-88.

The above carbon black is not particularly limited and a desired carbon black can suitably be selected from carbon blacks which are conventionally used as the reinforcing filler for rubber. Examples of the preferable carbon black include FEF, SRF, HAF, ISAF and SAF. Among these carbon blacks, HAF, ISAF and SAF are more preferable due to excellent abrasion resistance.

In the present invention, the carbon black of component (C) may preferably be used, in an amount in the range of 20 to 70 parts by weight per 100 parts by weight of the rubber component of component (A). When the amount is smaller than 20 parts by weight, there is a possibility that sufficient abrasion resistance is not exhibited. When the amount exceeds 70 parts by weight, problems such as deterioration in the low heat generating property, poor dispersion and a decrease in abrasion resistance may arise. From the standpoint of abrasion resistance, the heat generating property and dispersion, it is more preferable that the amount of carbon black is in the range of 30 to 60 parts by weight.

The rubber composition of the present invention firer comprises silica as component (D), where desired. As the silica, those having a specific surface area by nitrogen adsorption ($N_2SA$) in the range of 160 to 260 $m^2/g$ or greater and a dibutyl phthalate absorption (DBP) in the range of 180 to 260 ml/100 g is preferable. When $N_2SA$ is smaller than 160 $m^2/g$ or DBP is smaller than 180 ml/100 g, there is a possibility that abrasion resistance is insufficient. When $N_2SA$ exceeds 260 $m^2/g$ or DBP exceeds 260 ml/100 g, dispersion becomes poor and problems such as deterioration in the low heat generating property and a decrease in abrasion resistance may arise.

$N_2SA$ described above is a value measured in accordance with the method of ASTM D4820-93 after drying a sample at 300° C. for 1 hour. DBP described above is a value measured in accordance with the method of ASTM D2414-93.

Examples of the silica include wet silica (silica hydrate), dry silica (silicic acid anhydride), calcium silicate and aluminum silicate. Among these substances, wet silica is preferable.

In the present invention, the silica of component (D) is preferably used in an amount of 30 parts by weight or smaller per 100 parts by weight of the rubber component (A). When the amount exceeds 30 parts by weight, there is a possibility that the low heat generating property deteriorates. It is more preferable that the amount of silica is 20 parts by weight or smaller.

The rubber composition of the present invention comprises the rubber component (A), the hydrazide compound (B) and, where desired, the carbon black (C) and/or the silica (D), as described above. The rubber composition may further comprise vulcanizing agents, vulcanization accelerators, auxiliary vulcanization accelerators, antioxidants, softeners and other compounding ingredients which are conventionally used.

The heavy duty pneumatic tire of the present invention can be produced by using the above rubber composition for tread rubber, formed and vulcanized under a conventional condition of vulcanization.

The gas to be charged inside the tire may be air and/or an inert gas such as nitrogen.

To summarize the advantages of the present invention, the rubber composition of the present invention exhibits an excellent balance among the low heat generating property, heat resistance and abrasion resistance and can be advantageously applied to a tread rubber of a heavy duty pneumatic tire.

EXAMPLES

The present invention will be described more specifically with reference to examples in the following. However, the present invention is not limited to the examples.

Examples 1 to 3 and Comparative Examples 1 to 5

One hundred parts by weight of rubber components having the Compositions shown in Table 1,2-hydroxy-N'-(1,3-dimethylbutylidene)-3-naphthoic acid hydrazide (BMH) in amounts shown in Table 1, 50 parts by weight of carbon black of the SAY grade, 1.0 part by weight of microcrystaline wax (manufactured by SEIKO KAGAKU Co., Ltd.) 2.0 parts by weight of stearic acid, 1.3 parts by weight of an antioxidant 6C (N-phenyl-N'-(1-3-dimethylbutyl)-p-phenylenediamine), 3.5 parts by weight of zinc oxide, 1.0 part by weight of a vulcanization accelerator CZ(N-cyclohexyl-2-benzothiazyl sulfeneamide) and 1.2 parts by weight of sulfur were compounded and rubber compositions were prepared and vulcanized at 145° C. for 30 minutes. The prepared rubber compositions were used for tread rubbers and tires having sized (11R22.5) were prepared.

Samples were taken from the vulcanized rubbers and the low heat generating property and the heat resistance were obtained in accordance with the method described in the following. The abrasion resistance was evaluated using tires having the above tread rubbers in accordance with the method described in the following.

(1) Low Heat Generating Property

Using a test piece having a width of 5 mm, E' (tan δ) was measured under the condition of a stain of ±2%, a frequency of 52 Hz and a temperature of 100° C. by a viscoelasticity spectrometer manufactured by TOYO SEIKI SEISAKUSHO Co., Ltd. The reverse of the value of tan δ was used as the Low heat generating property. The result is expressed as an index based on the result of Comparative Example 1 which is set at 100. The greater the value, the better the low heat generating property.

(2) Tear Resistance

From a tread of a tire after the abrasion test, a block of 10×10×200 mm was obtained as a sample. A cut of 30 mm was formed in the sample at the center in the direction of the thickness. Portions of the sample at both sides of the formed cut were pulled apart and the tear strength was measured. The result is expressed as an index based on the result of Comparative Example 1 which is set at 100. The greater the value, the better the tear resistance.

(3) Abrasion Resistance

Tires of a size of 11R22.5 having a conventional structure were prepared. For the tread portion, rubber compositions shown in Table 1 (Examples and Comparative Example) were used. The tires were inflated to an inner pressure described below and attached to rims described below. The assembled wheels were each attached to an automobile at the same position. The automobile was driven for the distance of 20,000 km on a rough road and then the amount of abrasion was measured.

The inner pressure is the air pressure corresponding to the maximum load (the maximum ability of bearing the load) of a single wheel of the appropriate size described as the standard in "JATMA Year Book" edited by the Japanese Automobile Tire Manufacturers Association. The rim is the standard rim having the appropriate size described in the above standard.

The reverse of the amount of abrasion was used as the abrasion resistance. The result is expressed as an index based on the result of Comparative Example 1 which is set at 100. The greater the value, the better the abrasion resistance.

TABLE 1-1

|  | Example 1 | Example 2 | Example 3 | Comparative Example 1 |
|---|---|---|---|---|
| Rubber component (part by weight) | | | | |
| natural rubber | 80 | 60 | 50 | 100 |
| E-SBR[1] | — | — | — | — |
| S-SBR[2] | 20 | 40 | 20 | — |
| BR[3] | — | — | 30 | — |
| BMH[4] (part by weight) | 1.0 | 1.0 | 1.0 | — |
| Low heat generating Property (index) | 112 | 125 | 126 | 100 |
| Heat Resistance (index) | 122 | 117 | 115 | 100 |
| Abrasion resistance (index) | 114 | 116 | 125 | 100 |

TABLE 1-2

|  | Comparative Example 2 | Comparative Example 3 | Comparative Example 4 | Comparative Example 5 |
|---|---|---|---|---|
| Rubber component (part by weight) | | | | |
| natural rubber | 80 | 80 | 60 | 60 |
| E-SBR[1] | 20 | — | 40 | — |
| S-SBR[2] | — | 20 | — | 40 |
| BR[3] | — | — | — | — |
| BMH[4] (part by weight) | — | — | — | — |

TABLE 1-2-continued

| | Comparative Example 2 | Comparative Example 3 | Comparative Example 4 | Comparative Example 5 |
|---|---|---|---|---|
| Low heat generating Property (index) | 94 | 100 | 87 | 110 |
| Heat Resistance (index) | 105 | 106 | 112 | 101 |
| Abrasion resistance (index) | 107 | 107 | 110 | 110 |

Notes:
[1] E-SBR: manufactured by JSR Corporation; SBR obtained by the emulsion polymerization; the trade name: JSR #1500.
[2] S-SBR: manufactured by Firestone Chemical Company; SBR obtained by the solution polymerization and modified with Sn; the trade name: FS CHEMICAL HX765.
[3] BR: manufactured by UBE INDUSTRIES, Ltd.; polybutadiene rubber; the trade name: 150L.
[4] BMH: 2-hydroxy-N'-(1,3-dimethylbutylidene)-3-naphthoic acid hydrazide.

As shown in Table 1, the rubber compositions of the present invention comprising the styrene-butadiene rubber obtained by a solution polymerization having a Sn atom in its molecule, and a hydrazide compound exhibit an excellent balance between physical properties of the low heat generating property, tear resistance and abrasion resistance.

What is claimed is:

1. A heavy duty pneumatic tire having a tread wherein the rubber composition constituting the tread is a rubber composition obtained by compounding (A) a rubber component comprising 15 to 55% by weight of (i) a modified styrene-butadiene copolymer rubber which is obtained by a solution polymerization and has a tin atom introduced into its molecular chain, 45 to 85% by weight of (ii) at least one rubber selected from natural rubber and synthetic isoprene rubbers, and (B) a hydrazide compound.

2. A heavy duty pneumatic tire according to claim 1, wherein component (A) comprises 15 to 55% by weight of component (i) and 85 to 45% by weight of component (ii).

3. A heavy duty pneumatic tire according to claim 1, wherein the modified styrene-butadiene copolymer rubber of component (i) of component (A) is obtained by modifying a styrene-butadiene copolymer which is obtained by a solution polymerization using a lithium compound as an initiator with a tin compound.

4. A heavy duty pneumatic tire according to claim 1, wherein the hydrazide compound of component (B) is at least one compound selected from naphthoic acid hydrazides and salicylic acid hydrazides.

5. A heavy duty pneumatic tire according to claim 1, wherein 0.05 to 5 parts by weight of component (B) per 100 parts by weight of component (A) is compounded.

6. A heavy duty pneumatic tire according to of claim 1, wherein 20 to 70 parts by weight of (C) carbon black per 100 parts by weight of component (A) is further compounded.

7. A heavy duty pneumatic tire having a tread according to claim 4, wherein the hydrazide compound is at least one selected from the member consisting of 2-hydroxy-N'-(1-methylethylidene)-3-naphthoic acid hydrazide, 2-hydroxy-N'-(1-methylpropylidene)-3-naphthoic acid hydrazide, 2-hydroxy-N'-(1-methybutylidene)-3-naphthoic acid hydrazide, 2-hydroxy-N'-(1,3-dimethylbutylidene)-3-naphthoic acid hydrazide, 2-hydroxy-N'-(2,6-dimethyl-4-heptylidene)-3-naphthoic acid hydrazide, N'-(1-methylethylidene)-salicylic acid hydrazide, N'-(1-methylpropylidene)-salicylic acid hydrazide, N'-(1-methylbutylidene)-salicylic acid hydrazide, N'-(1,3-dimethylbutylidene)-salicylic acid hydrazide and N'-(2,6-dimethyl-4-heptylidene)-salicylic acid hydrazide.

\* \* \* \* \*